United States Patent
Beckham

(10) Patent No.: US 7,784,724 B2
(45) Date of Patent: Aug. 31, 2010

(54) ZERO-BACKLASH BAITCAST FISHING REEL WITH NON-CONTACT BACKLASH SENSING

(76) Inventor: James P. Beckham, 218 Colonial Cir., Athens, TX (US) 75751

(*) Notice: Subject to any disclaimer, the term of this patent is extended or adjusted under 35 U.S.C. 154(b) by 0 days.

(21) Appl. No.: 12/287,718

(22) Filed: Oct. 11, 2008

(65) Prior Publication Data

US 2009/0095835 A1  Apr. 16, 2009

Related U.S. Application Data

(63) Continuation-in-part of application No. 11/881,066, filed on Jul. 25, 2007, now Pat. No. 7,434,757, which is a continuation of application No. PCT/US2006/003115, filed on Jan. 26, 2006.

(60) Provisional application No. 61/124,672, filed on Apr. 18, 2008, provisional application No. 60/647,091, filed on Jan. 26, 2005.

(51) Int. Cl.
*A01K 89/01* (2006.01)

(52) U.S. Cl. .................. 242/223; 242/305; 73/598; 73/597

(58) Field of Classification Search ............. 242/223, 242/305, 323; 73/597, 598
See application file for complete search history.

(56) References Cited

U.S. PATENT DOCUMENTS

| | | | |
|---|---|---|---|
| 2,205,641 A | 6/1940 | Wilson | |
| 4,142,694 A | 3/1979 | Rankin, Jr. | |
| 4,196,871 A | 4/1980 | Kobayashi | |
| 4,402,470 A | 9/1983 | Hamayasu | |
| 4,549,703 A | 10/1985 | Atobe | |
| 4,585,183 A | 4/1986 | Puryear | |
| 4,674,699 A | 6/1987 | Fukushima et al. | |
| 4,733,831 A | 3/1988 | Runyon | |
| 4,779,814 A * | 10/1988 | Uetsuki et al. | 242/288 |
| 4,821,975 A | 4/1989 | Uetsuki et al. | |
| 4,940,194 A * | 7/1990 | Young | 242/288 |
| D321,925 S | 11/1991 | Shiman et al. | |
| 5,236,147 A * | 8/1993 | Kaneko | 242/223 |
| 5,289,992 A | 3/1994 | DuPlessis et al. | |
| 5,318,245 A | 6/1994 | Sato et al. | |
| 5,577,679 A | 11/1996 | Thomas | |
| 5,749,533 A | 5/1998 | Daniels | |
| 5,833,154 A * | 11/1998 | Kaneko | 242/223 |
| 5,833,156 A | 11/1998 | Park et al. | |
| 6,045,076 A | 4/2000 | Daniels | |
| 6,086,005 A | 7/2000 | Kobayashi et al. | |
| 6,109,555 A | 8/2000 | Svenson et al. | |
| 6,126,105 A | 10/2000 | Yamaguchi | |
| 6,206,311 B1 | 3/2001 | Kim et al. | |
| 6,412,722 B1 | 7/2002 | Kreuser et al. | |
| 6,973,999 B2 * | 12/2005 | Ikuta et al. | 188/161 |
| 6,983,907 B2 * | 1/2006 | Ikuta et al. | 242/288 |
| 7,503,517 B2 * | 3/2009 | Ikuta et al. | 242/288 |
| 2008/0017739 A1 | 1/2008 | Beckham | |

* cited by examiner

*Primary Examiner*—Emmanuel M Marcelo
(74) *Attorney, Agent, or Firm*—Jacqueline S. Larson

(57) ABSTRACT

A fishing reel that employs a non-contact line sensor to capture images of the backlash zone of a baitcast fishing reel, together with image analysis and feedback to a direct contact spool brake, with the result of gradual to near-instantaneously halting spool rotation, thereby decreasing or preventing backlash under all fishing conditions while maximizing cast distance.

20 Claims, 2 Drawing Sheets

ZERO-BACKLASH BAITCAST FISHING REEL WITH NON-CONTACT BACKLASH SENSING

This application is a continuation-in-part of copending U.S. patent application Ser. No. 11/881,066, filed Jul. 25, 2007, which is a continuation of International Patent Appln. No. PCT/US2006/003115, filed Jan. 26, 2006 and designating the United States, lapsed, and claims benefit of U.S. Provisional patent application Ser. No. 60/647,091, filed Jan. 26, 2005, lapsed. This application further claims benefit of U.S. Provisional patent application Ser. No. 61/124,672, filed Apr. 18, 2008. The entire disclosures of all of the above applications are incorporated herein by reference.

FIELD OF THE INVENTION

The present invention relates to a baitcast fishing reel, which is a fishing reel of the type having a spool mounted on a shaft or journal that rotates as line is paid out during the cast, and more particularly this invention is directed to the prevention of backlash in a baitcast fishing reel, while maximizing casting distance.

BACKGROUND OF THE INVENTION

The baitcast reel is used widely, but has an inherent shortcoming called backlash, which numerous patents have attempted to address. Backlash occurs when the reel spool overruns the outgoing line, causing the line to be caught and pulled back under the rotating spool, resulting in a knotted tangle of line in the "backlash zone". Said another way, backlash happens when more line is fed into the backlash zone of the baitcast reel than is pulled out.

Prior art has addressed this deficiency in three primary ways:

1. Braking Without Direct Feedback (Magnetic, Electrical, Mechanical, Centrifugal.) (See, e.g., U.S. Pat. Nos. 321,925; 4,142,694; 4,549,703; 4,585,183; 4,674,699; 4,733,831; 4,821,975; 5,318,245; 6,086,005; 6,126,105; 6,206,311; 6,412,722).

This approach addresses the backlash problem by slowing the rotation of the reel. This is done irrespective of the actual outgoing line velocity, with a major drawback being that it effectively reduces casting distance. In spite of this braking, and regardless of the manner of its application, backlash still occurs regularly with reels employing this design. Braking of this sort is marginally effective overall only if the user of the reel customizes his casting speed and style, and also makes manual brake settings adjustments. Usually, manual "thumbing" of the reel spool is further required to eliminate backlash. In addition, changes from cast to cast in wind conditions, lure weights and lure wind profiles require continuous manual changes by the reel user to minimize backlash.

All reels currently on the market that claim to address the problem of backlash utilize some variation on braking without direct feedback.

2. Braking with Line Tension Feedback (See, e.g., U.S. Pat. Nos. 2,205,641; 4,196,871; 5,289,992; 5,749,533; 6,045,076; 6,109,555)

In theory, this approach is much more effective than braking without any line condition feedback. In practice, this method fails to eliminate the problem. Its weakness lies in the fact that extremely small changes in line tension can be indicative of very large differences in line/spool speeds. Thus it has proven very difficult to measure line tension to the level of precision required for minute feedback changes. In addition, the line tension is inherently prone to variation from factors other than outgoing line velocity. These variables include wind conditions, line friction in the rod guides, line conditions (wet, dry), line stiffness, temperature, etc. In spite of prior art dating from 1943, because of these shortcomings no reel currently on the market utilizes any form of line tension feedback.

3. Braking with line Acceleration or Velocity Feedback

Park U.S. Pat. No. 5,833,156, Hamayasu U.S. Pat. No. 4,402,470 and Thomas U.S. Pat. No. 5,577,679 all employ some form of line acceleration or velocity feedback.

Park's primary embodiment utilizes an accelerometer attached to the line near the lure, which feeds back accelerations over time through an optical fiber in the fishing line. This data is mathematically integrated to obtain a velocity, which is compared to the spool velocity. This approach requires the complexity of a special device attached to the fishing line, as well as a special data-transferring fishing line. In addition, it measures acceleration, not velocity directly.

Thomas relies on "detectable" material in the fishing line to obtain line velocity. The drawback of this approach lies in the necessity of having available a fishing line with optic, magnetic or radioactive properties which can be sensed or detected.

Hamayasu, similarly, relies on the line having optical or magnetic properties so that photosensitive or magnetically sensitive sensors can be used to calculate outgoing line velocity.

These three patents all require a special fishing line to achieve the line velocity feedback. To date none of these inventions are available on the market, in part because of the unavailability of the special line.

In addition, most prior art reels, as well as the only reel currently on the market claiming to minimize (although not prevent) backlash, the Shimano Calcutta TE/DC™, use a form of spool velocity feedback; that is, they measure spool speed rather than the actual backlash condition, which is inherently problematic because the spool speed is not directly indicative of the actual backlash condition.

All prior art baitcast reels have a manual adjusting device that mechanically brakes the spool to help eliminate backlash. This brake is usually applied to the end of the spool spindle, and it impedes the rotation of the spool throughout the cast, reducing the chance of backlash by limiting the initial spool velocity and greatly reducing casting distance. Many reels call it a "cast control knob" or a "cast control cap". Backlash would be severe in any of these reels without this adjusting device, which adds weight, complexity and cost to the reels. The reel of the present invention negates the need for the cast control knob, allowing for longer casts and obviating the need for adjustments when changing lures of differing weights.

So the object of eliminating backlash remains unsatisfactorily addressed by the prior art and by the marketplace.

SUMMARY OF THE INVENTION

The present invention comprises a fishing reel that substantially eliminates backlash within the reel itself and maximizes casting distance by utilization of non-contact line sensing technology to detect backlash as it develops, direct and real-time feedback control, and direct contact spool braking, and without requiring the use of a manual mechanical brake adjusting device or of fishing line with special properties. This invention utilizes non-contact line sensing means that capture data of the backlash condition of the any conventional fishing line in the backlash zone and feed this data back to a controller, which activates a spool braking mechanism to slow or near-instantaneously halt spool rotation. In doing so, the line paid out by the spool into the backlash zone can never exceed the line pulled out of the backlash zone, thereby eliminating backlash while maximizing the casting distance. During a cast in which the lure is suddenly halted (as in the case of the lure striking a structure or object), the system senses control instability and fully halts the spool rotation so that backlash is prevented. In contrast to prior art reels utilizing spool braking without feedback, backlash is not simply minimized but is substantially to completely eliminated.

More particularly, the invention is directed to a baitcast fishing reel comprising a spool with fishing line; a non-contact line sensor located in proximity to the backlash zone of the reel so as to capture data of any backlash condition of the fishing line in the backlash zone; a data processor that analyzes the data from the non-contact line sensor for the purpose of quantifying the backlash condition; a system controller that receives and analyzes the quantified data from the data processor and provides a control signal to a brake actuator based on that data; a spool braking mechanism for directly applying resistance against the free rotation of the spool; and a brake actuator responsive to the control signal from the system controller to actuate the spool braking mechanism when the data from the non-contact line sensor indicates backlash of the fishing line in the backlash zone.

The invention is further directed to a method for decreasing or substantially to completely eliminating backlash of fishing line when casting, the method comprising utilizing the fishing reel of the present invention to detect the backlash condition of the fishing line as it travels through the backlash zone of the reel and to directly feed the backlash information to a spool brake in direct contact with the spool. The backlash condition measurement is accomplished by one or more non-contact line sensors that are integral to the reel and that image or otherwise sense line passage throughout the backlash zone regardless of the line type or condition, and which are independent of magnetic, optical, radioactive or other properties of the line. Additionally, the reel of the present invention eliminates the need for a manual adjusting device that mechanically brakes the spool.

DETAILED DESCRIPTION OF THE INVENTION AND PREFERRED EMBODIMENTS

Figure 1:
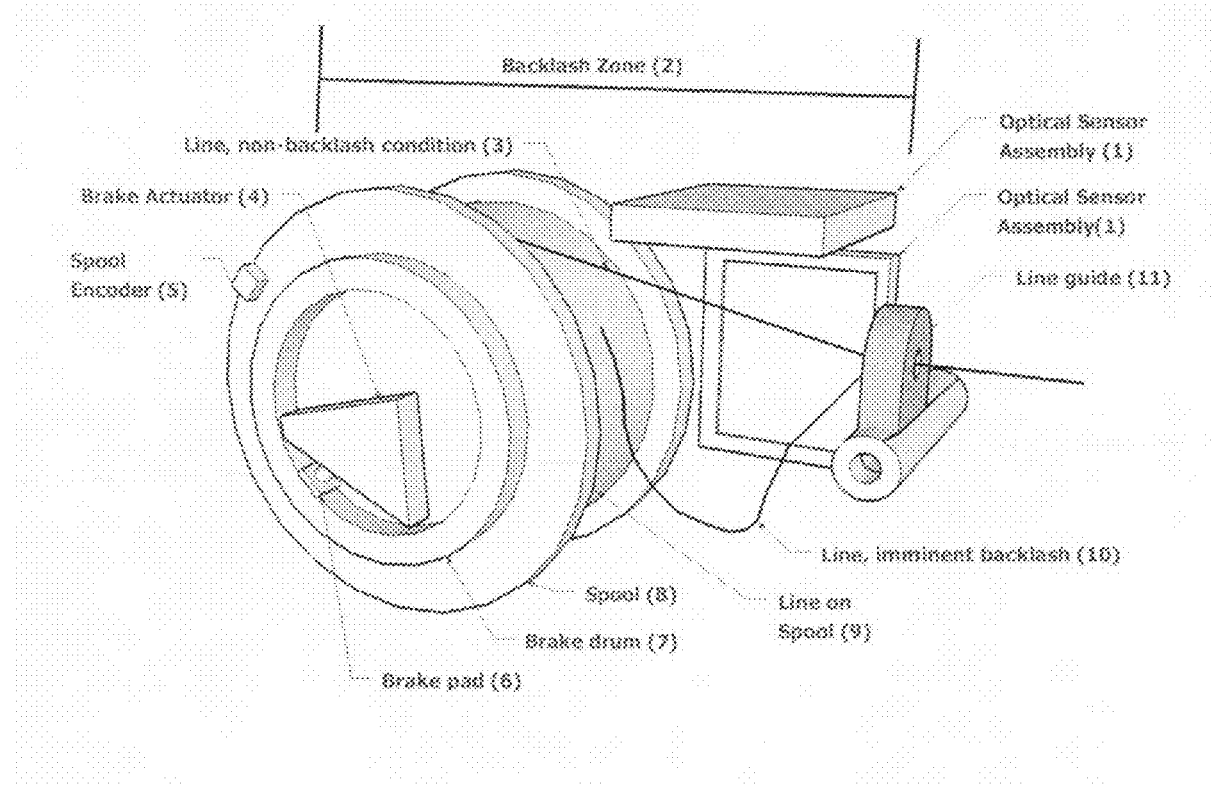
FIG. 1 is a diagram of the key components of one embodiment of the invention. It will be recognized as an idealized sketch of a baitcast fishing reel with only the spool and line guide of the reel visible.
Figure 2:
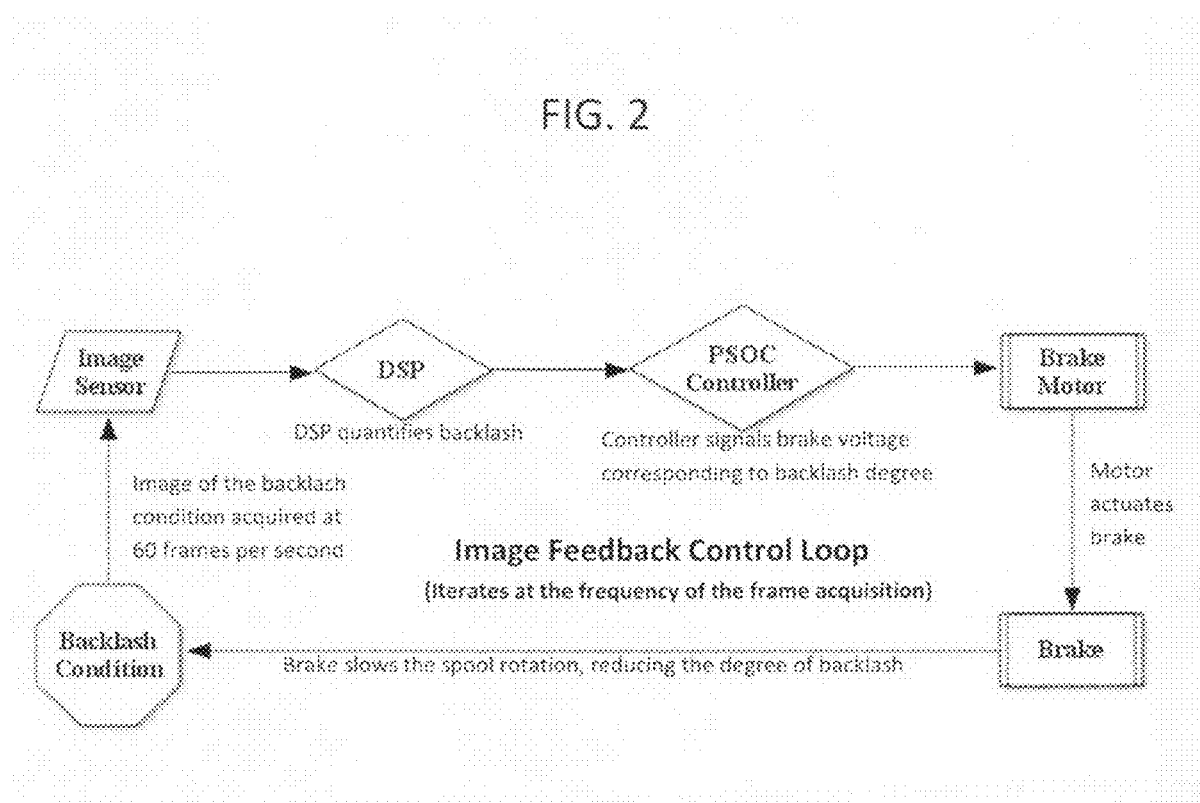
FIG. 2 is a flow chart of the control logic, as programmed on the controller chip in the embodiment illustrated in FIG. 1.

As used herein and in the appended claims, "a" and "an" mean one or more, unless otherwise clearly indicated.

By "non-contact", "non-contact line sensor", "non-contact sensor", "non-contact sensing" and the like are meant a means or sensor that reads or otherwise captures the position of fishing line in the backlash zone of a baitcast reel without coming into direct physical contact with the fishing line.

By "backlash zone" is meant the area approximately from the back of the spool to the line guide of the baitcast reel.

By "substantially eliminating backlash" is meant that the amount of backlash, if any, generated by the fishing reel is so small that it is not detected by the operator during the normal course of casting and reeling.

The zero-backlash fishing reel of this invention substantially to completely eliminates backlash and maximizes casting distance by imaging or otherwise reading the backlash zone, quantifying the degree of backlash through analysis of those images or readings, and braking the spool in corresponding degree to maintain an acceptable degree of or no backlash throughout the cast.

In one embodiment of the invention, CMOS optical sensors, lenses and light sources (the "optical sensor assembly", acting together as the non-contact line sensor) are positioned on the baitcast reel to collect image data of the backlash zone. The optical sensors capture images and send them to the system controller continuously over the time of the cast. The data is analyzed by the system controller and software, which determines the amount of backlash at the examined point in time and applies a brake at a corresponding force to reduce the backlash.

The data from the non-contact line sensor is analyzed by a DSP (Digital Signal Processor), which employs image analysis algorithms such as background subtraction (Olli, Gaussian, Pfinder, and the like) and Edge Detection (Canny, Sobel, Prewitt, and the like) to quantify the degree of backlash. This quantification is fed to the system controller, which sends instructions (the control signal) to the brake actuator to apply a braking force that corresponds to the quantification. This data capture, quantification and response occurs at a set or variable frequency, for instance at 60 times per second. It could occur at a frequency from about 10 to 1000+ times per second, as needed to obtain the necessary resolution to control the backlash. It should be understood that the frames capture rate available in image sensors, and the processing rate of DSPs and system controllers will necessarily increase as technologies in those fields bring about improvements. This invention does not propose a limit to the frame capture rates or chip processing speeds, and those skilled in the art will understand that these parameters are dependent upon the available technology. Alternatively, the data capture occurs at a variable frequency depending on the spool rotation speed, which is measured by an encoder or similar device.

In a second embodiment, a laser and receptor (similar to a barcode laser and reader, laser scanner or 3D laser) is aimed at the backlash zone of the reel. The laser/receptor system, acting as the non-contact line sensor, sends data to the controller continuously over the time of the cast.

In a third embodiment, the backlash zone is surveyed by a high-speed video image receptor acting as the non-contact line sensor. The acquired images are then analyzed and employed to provide data used to control spool braking for the purpose of eliminating backlash.

In a fourth embodiment, digital micro-mirror arrays and the like, acting as the non-contact line sensor, can be used for data acquisition from the backlash zone.

In a fifth embodiment, infrared emitters and sensors, acting as the non-contact line sensor, can be used for data acquisition from the backlash zone.

In a sixth embodiment, focal plane arrays, acting as the non-contact line sensor, are employed to capture image data of the backlash zone.

In an seventh embodiment, any other sort of optoelectronic system, including systems utilizing fiber optics, can be used as the non-contact line sensor for data acquisition from the backlash zone.

In a eighth embodiment, the data capture could be accomplished by a non-contact sensor that is able to detect movement of all conventional fishing lines by laser, magnetic, magnetic resonance, chemical, nanomechanical, acoustical (e.g., ultrasound), radiographic, thermal, or other means and to transmit the data in the form of current, pressure, mechanical, optical, chemical, molecular, nanomechanical, or quantum signals, for example.

The fishing reel of the invention further utilizes a system controller to receive and compare the measurements from the non-contact line sensor. It outputs a voltage (the control voltage) to a brake actuator that actuates a spool braking mechanism attached to the spool. The brake directly applies resistance against the free rotation of the spool to slow or stop the rotation and prevent backlash from occurring.

The spool braking mechanism is a mechanical system and is in direct contact with the spool. This type of brake is in contrast to some braking mechanisms in the prior art, which utilize magnets or electromagnets to apply a non-contact braking force. The brake of the present invention can apply very light force, thereby finely controlling spool braking, or apply full and immediate force, thereby completely halting and locking spool rotation. The aforementioned prior art electromotive or regenerative brake cannot halt and lock spool rotation, and as a result cannot prevent backlash under all casting conditions. Examples of braking mechanisms useful in the present invention include, but are not limited to, drum brake systems, disc brake systems, inertial braking systems, mechanical braking systems, and any combination of these. In the presently preferred embodiment, the spool braking mechanism is a drum-style brake that is actuated by a rotary voice coil actuator.

In an alternate embodiment, braking of the spool can be accomplished via one or more mechanisms, such as but not limited to, disc-type brake with brake calipers, inertial braking, magnetic braking, cone brake, and any combination of these.

The brake actuator useful in the present invention to actuate the spool braking mechanism may be, but is not limited to, a rotary voice coil actuator, a linear voice coil actuator, a servo motor, a stepper, a solenoid, a dc motor, a pneumatic motor, a hydraulic motor, an electric motor, a peizoactuator and a peizomotor.

EXAMPLES

Referring to FIG. 1, the spool 8 and fishing line 3,9,10 of the reel are selected from those normally used in baitcast fishing reels. The optical sensor assemblies 1 (comprising of an optical sensor lens and a light source), acting as the non-contact line sensor, are positioned on the reel to capture images of the fishing line in the backlash zone 2. Alternatively, one or more optical sensor assemblies may be positioned beneath, behind and/or above the spool 12, as well as well as in the position shown in FIG. 1, the only requirement being that the non-contact line sensor be in a position to capture the condition of the fishing line in the backlash zone. Light sources may be positioned independently of the optical sensor assemblies 1. A spool encoder 5 is positioned at the spool 8 to obtain spool rotational velocity.

The spool braking mechanism is a drum-style brake system. The brake drum 7 is affixed to the shaft of the spool 8, such that an impeding force applied to the drum will directly impede the spool rotation. A composite cork brake pad 6 is actuated by the brake motor (brake actuator) 4, and is configured so that it can adjustably brake the drum rotation from lightly or very firmly. The brake actuator arm (not shown) is sized to optimize braking force while maintaining a sufficient brake stroke length.

The brake motor 4 is a rotary voice coil actuator. This type of VCA is commonly used in computer hard drives. While other brake motors known to those skilled in the art may be used in the invention, the VCA is preferable for its extremely fast response times, which are desirable in a system that can go unstable (backlash) in a fraction of a second. The motor 4 of this example was taken from a 3.5 inch hard drive. It can produce a torque of 1.23 oz-inch at 9V. When the brake pad 6 moves to contact the drum 8, it impedes the rotation of the drum/spool assembly. As the voltage is increased, the force of the brake pad against the drum increases correspondingly.

Line 3, illustrating non-backlash condition, can be observed to be relatively straight from the spool to the line guide. Line 10, illustrating imminent backlash condition, can be observed to have accumulated in the backlash zone 2, forming in this example a loop. The image of the loop at any instant in time is captured by the image sensor assemblies 1. Application of the brake results in slowing of the spool 8 payout of line 10, causing the loop to diminish, thereby preventing backlash.

This type of brake of this invention is in contrast to some braking mechanisms in the prior art, which utilize magnets or electromagnets to apply a non-contact braking force. The brake of the present invention can apply a variable amount of force from very light force, thereby finely controlling spool braking, to full and immediate force, thereby completely halting and locking spool rotation. The aforementioned electromotive or regenerative brake cannot halt and lock spool rotation, and as a result cannot prevent backlash under all casting conditions.

The data processor of the present example is a digital signal processor, or DSP. In this embodiment, the DSP is a Blackfin DSP by Analog Devices. A program employing background subtraction algorithms runs on the DSP and processes the image data from the non-contact line sensor (optical sensor assemblies 1 in FIG. 1) that is fed to it at 60-150 frames per second. The non-contact line sensor is a ST VS6525 1/10" optical format CMOS sensor/lens assembly.

The system controller of the present example is comprised of a control chip (Cypress Semiconductors PSoC CY8C29466-24PXI) which receives the input from the digital signal processor. A C++ program that is downloaded to the chip performs logic and math operations, resulting in control of the system to eliminate backlash while maximizing cast distance. When the thumb bar of the reel (not shown) is depressed, a magnet is moved to a Hall effect sensor (Honeywell SS443A, not shown) which sends a voltage that initiates the start of the control loop. The control loop continues until the thumb bar is raised (by cranking the reel handle (not shown)). The control signal that is sent from the system controller to the brake actuator may be control voltage, as in the present example, or it may be a radio signal or a light beam, for example.

Two rechargeable batteries are used as the power storage system in the embodiment of FIG. 1. One 9V battery powers the control chip. A 6 V battery powers the brake motor. The batteries are charged by a dynamo that is driven by the reel crank as the line is retrieved from the cast.

In alternate embodiments, the power storage system could be various types of conventional batteries (Ni-Cad, Lithium, lead/Acid, Alkaline, rechargeable, etc), or unconventional power storage devices such as flywheel battery, fuel cell, capacitors, or other power storage devices.

In alternate embodiments the power generation system could be auxiliary recharging of batteries, flux charging of batteries, charging a flywheel battery by the reel crank as the line is retrieved, fuel cell, combustible fuel powered generator (butane, etc), and the like.

The fishing reel of the invention may further optionally comprise one or more user interfaces such as, but are not limited to: an on/off switch; a neutral control switch; LCD or other visual display; display of incoming line speed when reeling in; display of line payout length; display of number of casts; display of power storage level; dial or switch or ability to vary level of backlash control incrementally.

The fishing reel of the invention may further optionally comprise one of more control systems known in the art, including but not limited to computer controller chip, mechanical control system (gears), electric circuit board with no computer, combination of these, laser, optical and/or Image analysis chips and hardware, and the like mechanisms as are known in the art.

Software utilized in the control system can be hard-burned onto an onboard chip, or it can be downloadable, which allows the system to be changed. The software analyzes the data obtained from the backlash zone to determine the level of backlash at that data read time point, codes the brake response, and codes the user interface devices.

The various systems present in the reel (control, sensing, brake, user interface, etc) can be powered by, for example, conventional battery, mechanical flywheel battery, capacitor battery, regenerative battery charging spool energy dissipated in the cast, charging when the reel handle is cranked, flux charging a battery, and the like mechanisms as are known in the art.

Examples of user interfaces that may be utilized in the reel of the invention include, but are not limited to, on/off switch, neutral control switch, LCD or other visual display, display of number of casts, display of battery level. In addition, a dial or switch or ability to vary level of backlash control incrementally can be employed such that one end of the scale maximizes cast distance, and the other end more aggressively controls backlash for extreme cast speeds, wind conditions, and lure weights and wind profiles, and the like as are known in the art.

What is claimed is:

1. A baitcast fishing reel comprising:
   a spool with fishing line;
   a backlash zone;
   a non-contact line sensor located in proximity to the backlash zone of the reel so as to capture image data of backlash condition of the fishing line as the fishing line travels through the backlash zone over time;
   a data processor that analyzes the image data from the non-contact line sensor for the purpose of directly quantifying the backlash condition;
   a system controller that receives and analyzes the data from the data processor and provides a control signal to a brake actuator;
   a spool braking mechanism for directly applying resistance against the free rotation of the spool; and
   a brake actuator responsive to the control signal from the system controller to actuate the spool braking mechanism.

2. A fishing reel according to claim 1 wherein the non-contact line sensor is selected from those sensors that are able to detect movement of all conventional fishing lines by optical, laser, magnetic, magnetic resonance, chemical, nanomechanical, acoustical, radiographic or thermal means.

3. A fishing reel according to claim 1 wherein the non-contact line sensor is selected from the group consisting of an optical sensor, a variable frequency encoder, a laser and receptor, a high-speed video image receptor, a digital micro-mirror array, an infrared emitter and sensor, focal plane arrays, and an optoelectronic system.

4. A fishing reel according to claim 3 wherein the non-contact line sensor is an optical sensor.

5. A fishing reel according to claim 4 wherein the optical sensor is selected from the group consisting of focal plane arrays, CMOS and CCD.

6. A fishing reel according to claim 1 wherein the control signal is control voltage, a radio signal or a light beam.

7. A fishing reel according to claim 6 wherein the control signal is control voltage.

8. A fishing reel according to claim 1 wherein the spool braking mechanism is selected from the group consisting of a drum brake system, a disc brake system, an inertial braking system, a mechanical braking system, cone brakes, and any combination of these.

9. A fishing reel according to claim 8 wherein the spool braking mechanism is a drum brake system comprising a drum brake and one or more brake pads.

10. A fishing reel according to claim 1 wherein the brake actuator is selected from the group consisting of a rotary voice coil actuator, a linear voice coil actuator, a servo motor, a stepper, a solenoid, a dc motor, a pneumatic motor, a hydraulic motor, an electric motor, a peizoactuator and a peizomotor.

11. A fishing reel according to claim 10 wherein the brake actuator is a rotary voice coil actuator.

12. A fishing reel according to claim 1 wherein the data processor is a digital signal processor.

13. A fishing reel according to claim 12 wherein the digital signal processor employs a program that applies image analysis algorithms.

14. A fishing reel according to claim 1 wherein the non-contact line sensor is an optical sensor, the data processor is a digital signal processor, the control signal is control voltage, the spool braking mechanism comprises a drum brake and one or more brake pads, and the brake actuator is a rotary voice coil actuator.

15. A method for substantially eliminating backlash when casting a fishing line, the method comprising utilizing the fishing reel of claim 1.

16. A method according to claim 15 wherein the non-contact line sensor of the fishing reel is selected from the group consisting of an optical sensor, a variable frequency encoder, a laser and receptor, a high-speed video image receptor, a digital micro-mirror array, an infrared emitter and sensor, focal plane arrays, and an optoelectronic system.

17. A method according to claim 15 wherein the control signal of the fishing reel is control voltage, a radio signal or a light beam.

18. A method according to claim 15 wherein the data processor of the fishing reel is a digital signal processor.

19. A method according to claim 18 wherein the digital signal processor employs a program that applies image analysis algorithms.

20. A method according to claim 15 wherein the non-contact line sensor of the fishing reel is an optical sensor, the data processor of the fishing reel is a digital signal processor, the control signal of the fishing reel is control voltage, the spool braking mechanism of the fishing reel comprises a drum brake and one or more brake pads, and the brake actuator of the fishing reel is a rotary voice coil actuator.

* * * * *